United States Patent [19]

Lin

[11] Patent Number: 4,893,802
[45] Date of Patent: Jan. 16, 1990

[54] ANGLE-ADJUSTABLE WORKPIECE SEAT

[75] Inventor: Charles Lin, Taichung, Taiwan

[73] Assignee: Jason Wu, Taichung, Taiwan

[21] Appl. No.: 207,107

[22] Filed: Jul. 14, 1988

[51] Int. Cl.⁴ ............................................. B23Q 1/04
[52] U.S. Cl. ....................................... 269/74; 269/76; 269/902
[58] Field of Search .................. 269/74, 76, 77, 81–83, 269/268, 271, 282, 902

[56] References Cited

U.S. PATENT DOCUMENTS

| | | | |
|---|---|---|---|
| 2,203,162 | 6/1940 | Lee | 269/74 |
| 2,364,150 | 12/1944 | Lowenstein | 269/902 |
| 2,573,542 | 10/1951 | Cherry | 269/74 |
| 2,750,824 | 6/1956 | DiRuscio | 269/76 |
| 2,816,489 | 12/1957 | Robbins et al. | 269/902 |

Primary Examiner—Judy Hartman
Attorney, Agent, or Firm—Fleit, Jacobson, Cohn, Price, Holman & Stern

[57] ABSTRACT

An angle-adjustable workpiece seat includes a base having a bottom surface, a top surface having a concave primary supporting surface, a confining surface, a receiving groove and holes, a locking piece having a pressing surface and corresponding holes, threaded elements threaded through corresponding holes of the base and the locking piece for driving the locking piece to laterally translate in the receiving groove, and a sliding member having a top V-shaped positioning surface and a bottom sliding rail complementary to a sliding groove formed by said pressing, primary supporting and confining surfaces and having a primary sliding surface matching against and slidable on the primary supporting surface. The bottom surface can detachably attach thereunder two identical cylinders. The positioning surface can include two plane surfaces each of which detachably attaches thereto a pad piece.

4 Claims, 5 Drawing Sheets

ANGLE-ADJUSTABLE WORKPIECE SEAT

BACKGROUND OF THE INVENTION

The present invention relates to a workpiece seat, and more particularly to an angle-adjustable one.

In conventional working technique, one usually suffers from a positioning difficulty if working a workpiece at a specific angle is desired, e.g. milling a plane at 37° or drilling on a plane at 42° with respect to the reference plane. It has been proposed that gauge blocks are placed beneath a workpiece to incline it to the desired angle and then to fix it by a vise in order to work thereon. Using gauge blocks, however, demands a complicated calculation. Furthermore, gauge blocks are expensive and should be a measuring tool but not inserts beneath the workpiece to be easily damaged. Thus, it is developed a fixture which can fix thereon a workpiece which can then be worked at a specific angle. Nevertheless, the gauge of the workpiece is inevitably similar.

In order to overcome the above shortcomings encountered by the prior art, an angle-adjustable workpiece seat, as shown in FIGS. 1 & 2, has been marketed. The seat includes a base 10 having a top sliding rail 11 having a T-shaped crosssection and a scale 12, a sliding member 13 having a sliding T-shaped groove 14, a scale 15 and a V-shaped positioning surface 16, a barrel 17 having a head 18 sliding in sliding groove 14, and a bolt 19 screwing from the bottom of base 10 into barrel 17 in order to firmly urge sliding member 13 against base 10. The relative position or angle between sliding member 13 and base 10 can be adjusted by sliding sliding groove 14 on sliding rail 11. After a long period of use, it has been revealed that such seat still has the following disadvantages:

1. The locking force between sliding member 13 and base 10 by pulling member 13 toward base 10 by bolt 19 is relatively small so that the locking between member 13 and base 10 will get loose if a larger working load is applied on the workpiece and thus a working error is introduced into the workpiece.

2. Since bolt 19 threads into barrel 17 from the bottom of base 10, such seat must be turned by 90° or 180° in order to tightly screw bolt 19 on barrel 17 after the angle adjustment between member 13 and base 10 has been made, this being not only inconvenient but also prone to incur a relatively displacement therebetween which requires a renewed angle adjustment therebetween.

3. Working or machining barrel 17 and rail and groove 11 & 14 of T-shaped crosssection is relatively complicated and expensive.

4. V-shaped surface 16 can only fit thereon a workpiece of a specific gauge and thus multiple sliding members 13 must be provided if working workpieces of different gauges on base 10 is desired.

5. The angle between member 13 and base 10 can only be determined by the eyes of the user viewing scales 12, 15 and cannot be examined whether it is accurate or not if a workpiece is to be precisely worked.

SUMMARY OF THE INVENTION

It is therefore an object of the present invention to provide a workpiece seat capable of ensuring a locking state between the sliding member and the seat.

It is further an object of the present invention to provide a workpiece seat capable of being operated in an easier manner.

It is yet an object of the present invention to provide a workpiece seat having elements having relatively simplified structures.

It is additional an object of the present invention to provide a workpiece seat capable of positioning thereon workpieces of different gauges.

It is still an object of the present invention to provide a workpiece seat having a design capable of examining the angle between the sliding member and the base.

According to the present invention, an angle-adjustable workpiece seat includes a base having a bottom surface, a top surface having a concave primary supporting surface, a confining surface, a receiving groove and holes, a locking piece slidably positioned in the receiving groove and having a pressing surface and corresponding holes, threaded elements respectively threaded through the corresponding holes of the base and the locking piece for driving the locking piece to laterally translate in the receiving groove, and a sliding member having a top positioning surface and a bottom sliding rail complementary to the sliding groove formed by the pressing, primary supporting and confining surfaces and having a primary sliding surface matching against and slidable on the primary supporting surface and a contacting surface upwardly extending from one side edge of the sliding surface and capable of matching against the pressing surface.

Preferably the positioning surface is a V-shaped surface formed by two plane surfaces each of which detachably attaches thereto a pad piece for changing the depth of the V-shaped surface.

The bottom surface can detachably mount thereunder in the direction of an axis passing through curvature centers of the primary supporting surface two identical cylinders acting as examining sine bars.

The present invention may best be understood through the following description with reference to the accompanying drawings, in which:

DETAILED DESCRIPTION OF THE PREFERRED EMBODIMENT

Figure 1:
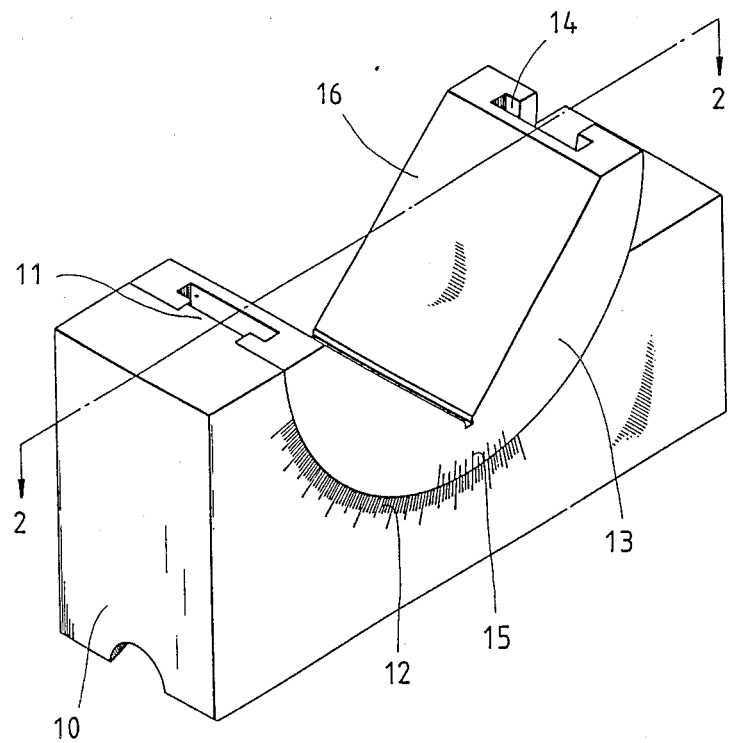
FIG. 1 is a perspective view showing the prior angle-adjustable workpiece seat.
Figure 2:
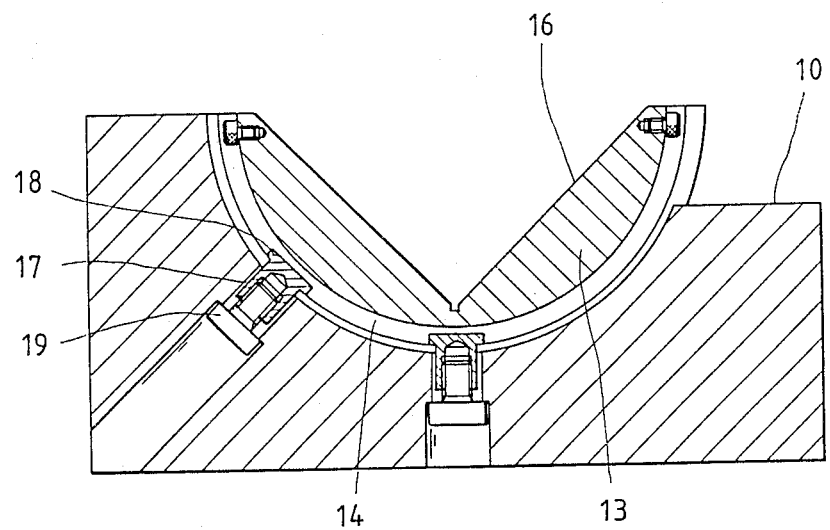
FIG. 2 is a sectional view taken along line 2—2 in FIG. 1.
Figure 3:
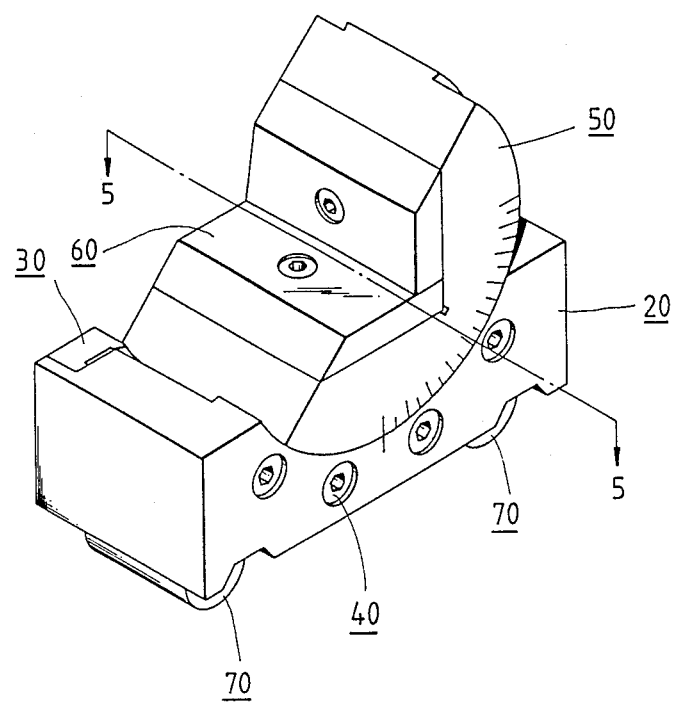
FIG. 3 is a perspective view showing a preferred embodiment of an angle-adjustable workpiece seat according to the present invention.
Figure 4:
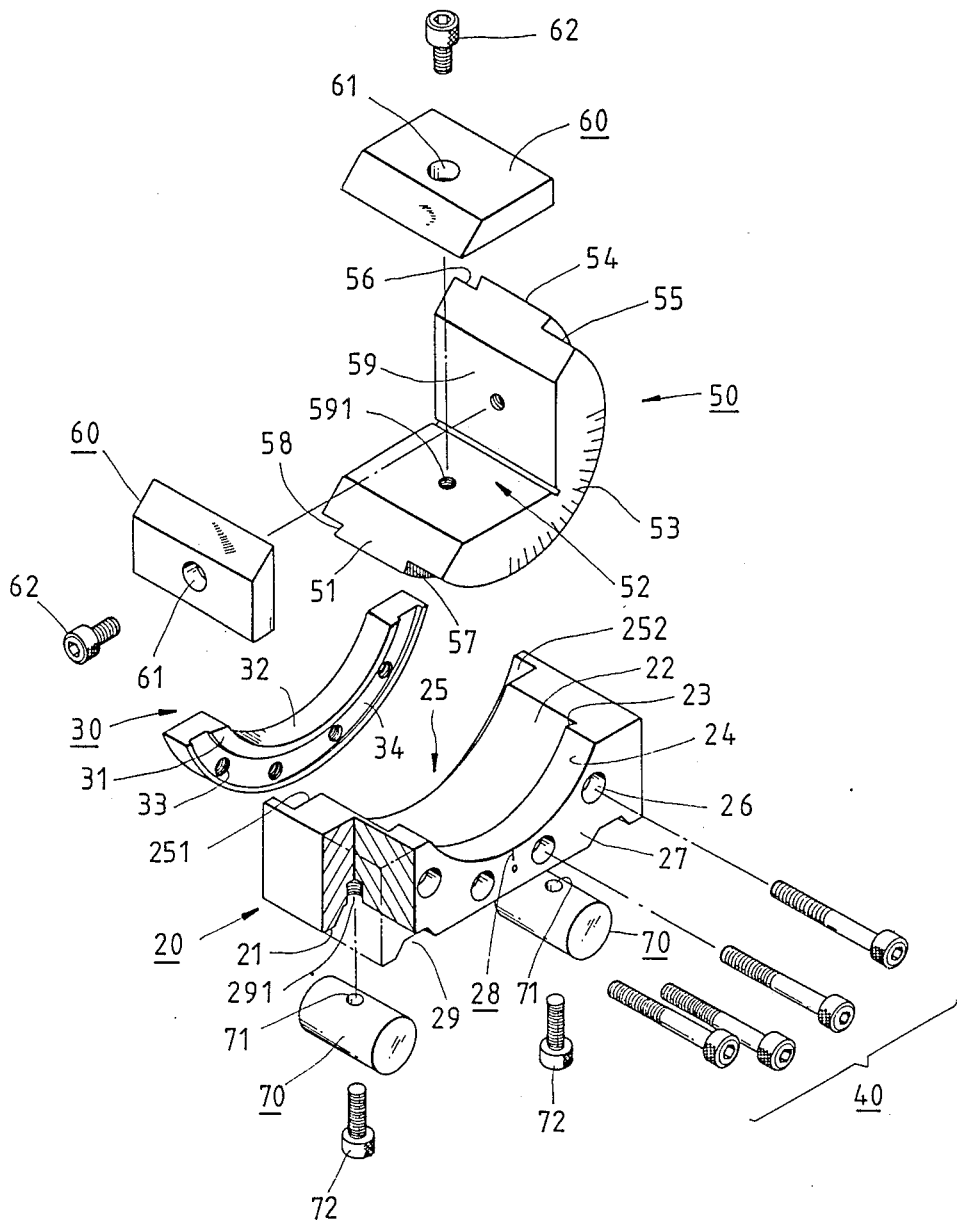
FIG. 4 is an exploded view of a workpiece seat in FIG. 3.
Figure 5:
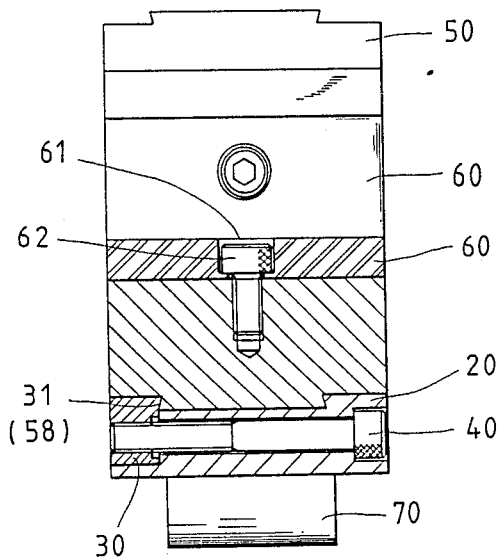
FIG. 5 is a sectional view taken along line 5—5 in FIG. 3.

Referring now to FIGS. 3–5, the present workpiece seat includes a base 20, a locking piece 30, threaded elements 40, a sliding member 50 and two pad pieces 60.

Base 20 has a bottom surface 21, a top surface having a concavely arcuate primary supporting surface 22, a confining surface 23 upwardly extending from an arcuate side edge of surface 22 and a secondary supporting surface 24 arcuately and laterally extending from surface 23 and having an axis passing through curvature centers thereof coincident with that of primary surface 22, a receiving groove 25 downwardly extending from the opposite arcuate side edge of surface 22 and having at least a vertical shoulder surface 251 being in connection with surface 22 and a stopping surface 252 laterally extending from a bottom edge of surface 251, four countersink holes 26 parallelly extending in relation to the above axis of surfaces 22, 24 from surface 251 to the front surface 27 of base 20, a scale 28, and two grooves 29 provided in the direction of the above axis on bottom surface 21 and having respective threaded holes 291.

Locking piece 30 is approximately crescent-shaped and slidably positioned in receiving groove 25 and includes a pressing surface 31 being in connection with primary surface 22 and facing to confining surface 23, a secondary supporting surface 32 laterally extending from the top edge of pressing surface 31 and coaxial with surfaces 22, 24, four threaded through holes 33 corresponding to countersink holes 26, and an arcuate shallow groove 34 adjacent to press surface 31 and passing through through holes 33. Pressing surface 31, primary surface 22 and confining surface 23 cooperatively form a sliding groove with pressing surface 31 and confining surface 23 being upwardly inclined toward a middle portion therebetween in order that the sliding groove has a dovetailed crosssection.

Four threaded elements 40 respectively pass through countersink holes 26 into corresponding holes 33 and are capable of driving locking piece 30 to laterally translate in receiving groove 25.

Sliding member 50 has a bottom rail 51 complementary to the sliding groove of base 20 and piece 30, a top positioning surface 52, an angle scale 53, a primary sliding surface 54 formed by sliding rail 51, two secondary sliding surfaces 55, 56 formed on two sides of sliding rail 54, and two upwardly extending contacting surfaces 57, 58 respectively defined between and connecting with surface 54 and surfaces 55, 56 being respectively complementary to confining surface 23 and pressing surface 31. Since surfaces 54, 55 & 56 respectively match with surfaces 22, 24 & 32, sliding rail 51 can have a positive slide on the sliding groove of base 20 and piece 30. Positioning surface 52 is V-shaped and formed by two perpendicularly intersecting plane surfaces 59 each of which has a central threaded hole 591.

Pad pieces 60 are to be respectively matched against plane surfaces 59 and each of which is provided with a countersink hole 61 corresponding to respective threaded hole 591 in order that a countersunk bolt 62 can pass through countersink hole 61 into the respective threaded hole 591 so that pad pieces 60 can be secured to plane surfaces 59 respectively.

The present workpiece seat further includes two cylinders 70 which are perfectly rounded and respectively matched against grooves 29 and each of which includes a radial countersink through hole 71 through which a countersunk bolt 72 can be screwed into respective threaded hole 291 to position respective cylinder 70 under base 20.

Figure 6:
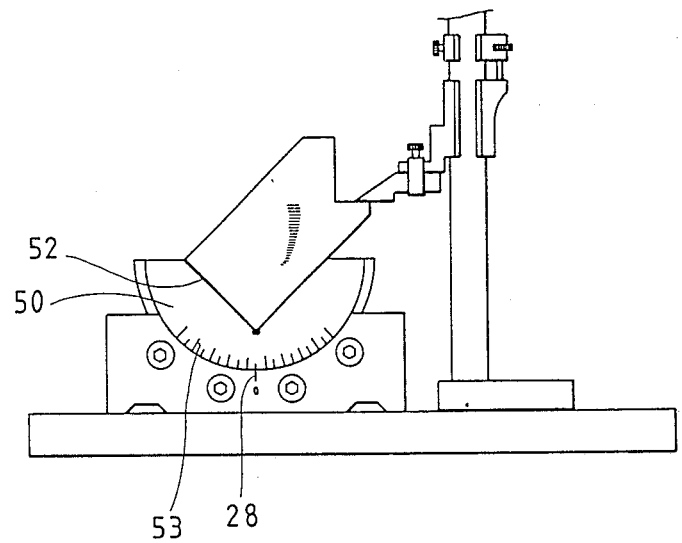
FIGS. 6A–6C are schematic views showing the different cooperation between the the positioning surface and the pad piece of a workpiece seat in FIG. 3.
Figure 6:
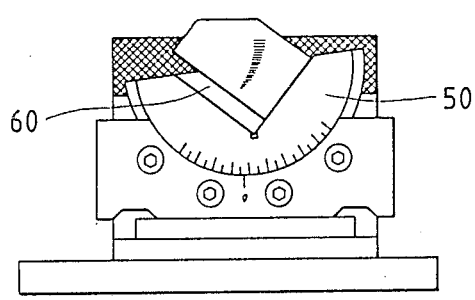
Figure 6:
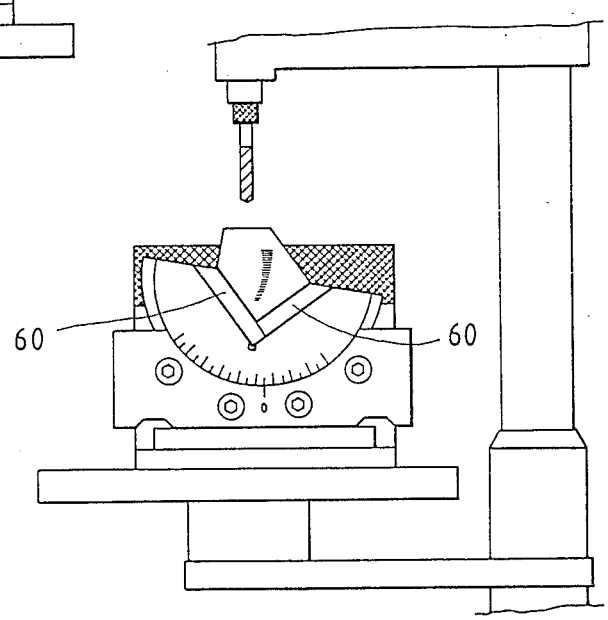

Referring to FIGS. 5–6C, if a relative movement between member 50 and base 20 is desired, threaded elements 40 are loosened to laterally translate locking piece 30 to unlock member 50 from base 20. Then, by the assistance of scales 53, 28, member 50 is slid on base 20 to the desired position. Finally, elements 40 are tightly screwed on locking piece 30 again to press pressing surface 31 against contacting surface 58 so that base 20 needs not be turned as in the prior art in order to lock member 50 on base 20, and a more secure locking state between member 50 and base 20 can be ensured to bear a larger working load on the workpiece on positioning surface 52.

As shown in FIGS. 6A–6B, by whether incorporating one or two pad pieces 60 on positioning surface 52, positioning surface 52 can be selected to position thereon workpieces of different gauges.

Figure 7:
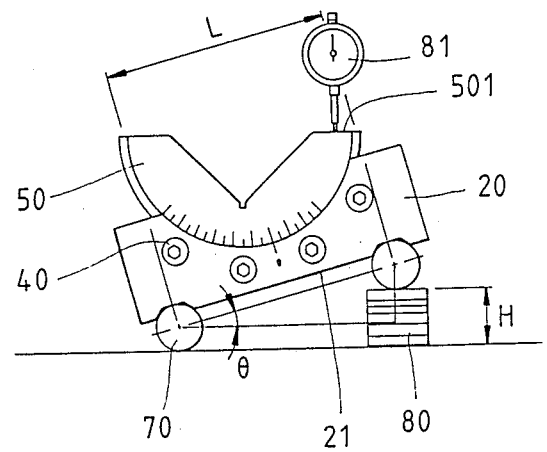
FIG. 7 is a schematic view showing the present workpiece seat in an angle examination.

As shown in FIG. 7, if the workpiece needs to be precisely worked, cylinders 70 can be mounted to bottom surface 21 to act as sine bars. In other words, according to the trigonometrical sine function, $\sin\theta = H/L$. Since L (the length of the line segment connecting axes of cylinders 70) is known, $\theta$ (the angle included by the line segment and the horizontal plane) can be determined by inserting gauge blocks 80 of height H under one of cylinders 70. Whether a correct relative position between member 50 and base 20 has been obtained through the assistance of scales 53 & 28 can be ascertained by a gauge meter 81 examining whether an end surface 501 is horizontal.

Figure 8:
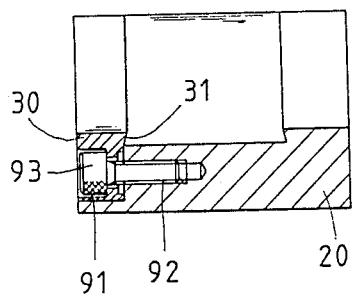
FIG. 8 is a schematic view showing another locking manner for the base and the locking piece of the present workpiece seat.

As shown in FIG. 8, the locking manner between locking piece 30 and base 20 can alternatively be that locking piece 30 is provided with countersink holes 91, base 20 is provided with threaded holes 92 and threaded elements 93 respectively screw through countersink holes 91 into corresponding threaded holes 92 respectively.

Through the above description, it should now become apparent how and why the present invention can achieve its contemplated objects.

What I claim is:

1. An angle-adjustable workpiece seat comprising: a base having: a bottom surface, a top surface having a concavely arcuate primary supporting surface, a confining surface upwardly extending at an incline from a first arcuate side edge of said primary supporting surface towards a central portion of the primary supporting surface, a concavely arcuate receiving groove downwardly extending from a second arcuate side edge of said primary supporting surface, said receiving groove having at least a shoulder surface being in connection with said primary supporting surface and a stopping surface laterally extending from a bottom edge of said shoulder surface, a plurality of holes extending parallelly in relation to each other and to an axis of curvature of said primary supporting surface, said plurality of holes extending through said shoulder surface a concavely arcuate secondary supporting surface extending laterally from the; a top portion of the confining surface with an axis of curvature coincident with said axis of curvature of the primary surface;

a substantially crescent shaped locking piece slidably positioned in said receiving groove, extending substantially over the length of said groove and having, said locking piece pressing surface being in connection with said primary supporting surface and being upwardly inclined toward the central portion of the primary surface, a second concavely arcuate secondary supporting surface extending laterally from a top portion of said pressing surface said second secondary supporting surface having an axis of curvature coincident with the axis of curvature of the primary surface: an arcuate shallow groove adjacent to said pressing surface: and a plurality of holes corresponding to said holes of said base extending from said groove; whereby said pressing surface, said primary supporting surface and said confining surface together form a sliding groove of dovetail cross-section;

a plurality of threaded elements respectively threaded through corresponding ones of said holes of said base and said locking piece, said threaded elements being capable of driving said locking piece to laterally translate in said receiving groove; and a sliding member having a substantially V-shaped top positioning surface, formed by two plane surface each surface having means for receiving a detachable pad piece said sliding member further including a bottom sliding rail of dovetail cross-section complementary to said sliding groove, having a primary sliding surface matching, slidable on said primary support surface, a contacting surface upwardly extending from one side edge of said sliding surface and capable of matching said pressing surface, and two secondary sliding surfaces for sliding on said secondary supporting surfaces respectively.

2. An angle-adjustable workpiece seat according to claim 1 wherein said bottom surface detachably attaches thereunder two identical cylinders.

3. An angle-adjustable workpiece seat according to claim 1 wherein:

said holes of said base are countersunk through holes;

said holes of said locking piece are threaded holes; and said threaded elements respectively thread through said countersunk holes into said corresponding threaded holes respectively.

4. An angle-adjustable workpiece seat according to claim 1 wherein:

said holes of said base are threaded holes;

said holes of said locking pieces are countersunk through holes; and said threaded elements respectively thread through said countersunk holes into said corresponding threaded holes respectively.

* * * * *